(12) United States Patent
Freedman et al.

(10) Patent No.: US 6,398,302 B1
(45) Date of Patent: Jun. 4, 2002

(54) ADJUSTABLE CHILD SEAT

(76) Inventors: Gerald Freedman, 933 Lake, Wilmette, IL (US) 60091; Michael Douglas Moffa, 1435 Woodlawn Ave., Glenview, IL (US) 60025; Erin Renée Reichenberger, 4448 N. Western #2B, Chicago, IL (US) 60625

( * ) Notice: Subject to any disclaimer, the term of this patent is extended or adjusted under 35 U.S.C. 154(b) by 0 days.

(21) Appl. No.: 09/663,999

(22) Filed: Sep. 18, 2000

(51) Int. Cl.[7] .............................................. A47D 15/00
(52) U.S. Cl. ............................. 297/250.1; 297/216.11; 297/260.1; 297/484; 297/483
(58) Field of Search ........................ 297/250.1, 216.11, 297/260.1, 484, 483

(56) References Cited

U.S. PATENT DOCUMENTS

| | | | | |
|---|---|---|---|---|
| 3,910,634 A | * | 10/1975 | Morris | 297/384 |
| 4,376,551 A | * | 3/1983 | Cone | 297/250 |
| 4,611,825 A | * | 9/1986 | Patterson | 280/808 |
| 5,082,325 A | * | 1/1992 | Sedlack | 297/250 |
| 5,899,534 A | * | 5/1999 | Gray | 297/484 |
| 6,030,047 A | * | 2/2000 | Kain | 297/484 |
| 6,155,638 A | * | 12/2000 | Bapst | 297/250.1 |

* cited by examiner

*Primary Examiner*—Carl D. Friedman
*Assistant Examiner*—Dennis L. Dorsey
(74) *Attorney, Agent, or Firm*—Alter and Weiss; Irwin C. Alter

(57) ABSTRACT

This invention relates to an adjustable child-restraint seat for a vehicle comprising a seat shell, a harness panel, and a restraint harness, The seat shell has a top-portion formed to include two spaced-apart belt-receiving openings. The harness panel consists of a harness casing, a slot panel, an adjustable anchor-point shaft and a spring biased medium that retains the shaft in the corresponding slot of said slot panel . The restraint harness is coupled with the adjustable anchor-point shaft and couples with the restraint coupler which is attached to the bottom-seat portion to provide an adjustable shoulder harnessing system. The apparatus allows the user to easily adjust the height of the shoulder harness from the front of the seat shell.

3 Claims, 4 Drawing Sheets

ADJUSTABLE CHILD SEAT

BACKGROUND OF THE INVENTION

The present invention relates to child restraint seats for use in vehicles, and, more particularly to child restraint seats that provide a means for more comfortably seating and more safely seating a child as the child grows too large for the conventional child seat. Many child restraint seats available are manufactured to provide adequate restraint for smaller children. As children age, there is a transition period in which a conventional child restraint seat becomes too small, and, concurrently the standard restraint systems in automobiles do not provide an adequate restraint system because the child is yet too small.

To cure this inadequacy, there are currently adjustable child restraint seats available. Though these seats offer adequate restraint and comfort to the child, the caregiver has a difficult and confusing task of preparing and re-preparing the seat as the child grows. For most currently available adjustable child restraint seats, the caregiver must couple a restraint harness through a pair of shoulder belt receiving apertures in the restrain seat and then couple the restraint harness to the restraint seat. As the child grows, the caregiver must repeat this several times, removing the restraint harness, rethreading the harness through the restraint seat and couple the restraint harness to the restraint seat. This often results in the caregiver becoming confused and irritated. Previous patents disclose a seating apparatus with aforesaid adjustable restraint mechanism, namely, U.S. Pat. No. 5,899,534, which discloses a child restraint seat with multiple slots through which a restraint harness may be passed, thus allowing adjustable restraint of a child.

Also, there are adjustable restraint seats available by which the shoulder harness may be adjusted by means of a slot panel and anchor point model attached to the back of the restraint seat. However, the caregiver must reach behind the restraint seat to adjust the shoulder restraint, an uncomfortable task for the caregiver. Previous patents disclose a seating apparatus with aforesaid adjustable restraint mechanism, namely, U.S. Pat. No. 6,030,047, which discloses an adjustable restraint mechanism using a harness panel in combination with a slot panel and an anchor-point shaft that is only accessible from the back of the seat.

Accordingly, it can be seen that there is a need for an apparatus to overcome the problems enumerated above relating to adjustable restraint-harness seating. It is to these objectives that the present invention is directed. The present invention provides the child with a comfortable and secure seat, while providing the caregiver with the comfort and ease of being able to conveniently adjust the restraint system from the front of the restraint seat.

SUMMARY OF THE INVENTION

Accordingly, it is the object of the present invention to provide a secure and comfortable child restraint seat that has an adjustable restraint mechanism which is easily adjustable from the from of the seat, thereby resolving the caregiver of the hassle and confusion of reaching behind the seat to adjust the restraint mechanism. Child restraint seats are most often developed so that the back of the child seat rests against the back seat of a automobile. This presents a problem when a caregiver wants to adjust the restraint mechanism. The caregiver must unsecure the child seat from automobile, flip the seat around, adjust the restraint mechanism, and re-secure the child seat to the automobile seat.

The present invention allows the caregiver to adjust the restraint mechanism of the child seat in two-simple steps. The caregiver must only, 1) press the anchor-point shaft towards the seat-shell, and 2) slide the said shaft up or down a length of said top-seat portion, thus simultaneously allowing the caregiver to increase or decrease the height and space afforded by the restraint mechanism. Moreover and importantly, the present invention does not require a caregiver to uncomfortably reach behind the child seat to adjust the height of the restraint mechanism. As stated, this is done from the front of the seat.

The following description of the drawings and the preferred embodiment present the best mode of carrying out the invention as presently perceived. Additional features and advantages of the invention will become apparent to those skilled in the art.

BRIEF DESCRIPTION OF THE DRAWINGS

FIG. 3A shows a sectional view of spring biased medium, 7, that is preferably a plastic, holding the anchor-point shaft, 4, in a terminal slot of the slot panel, 6.

DETAILED DESCRIPTION OF THE DRAWINGS AND THE PREFERRED EMBODIMENT

Figure 1:
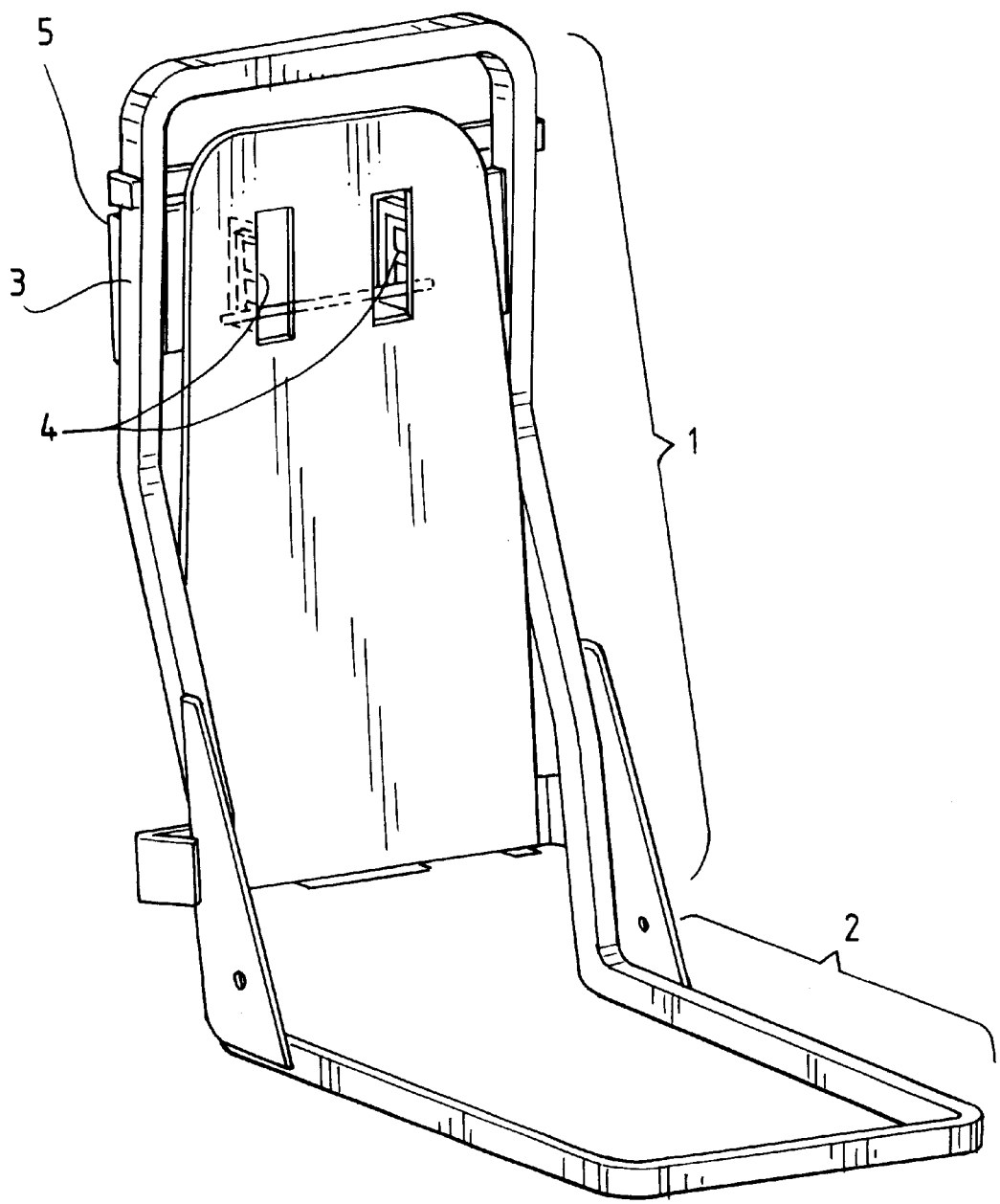
FIG. 1 is a pictorial front perspective view illustrating the seat shell. The top-seat portion is shown as 1 while the bottom-seat portion is shown as 2. The belt receiving openings are shown as 3. The harness panel is shown as 5 attached to the back of the top-seat portion directly in line with the belt-receiving openings, 3, so that the adjustable anchor-point shaft, shown as 4, is accessible through the said belt receiving openings, 3, thus allowing the restraint system to be adjusted from the front of the top-seat portion by allowing access to the adjustable anchor-point shaft, 4, through the belt receiving openings, 3.
Figure 2:
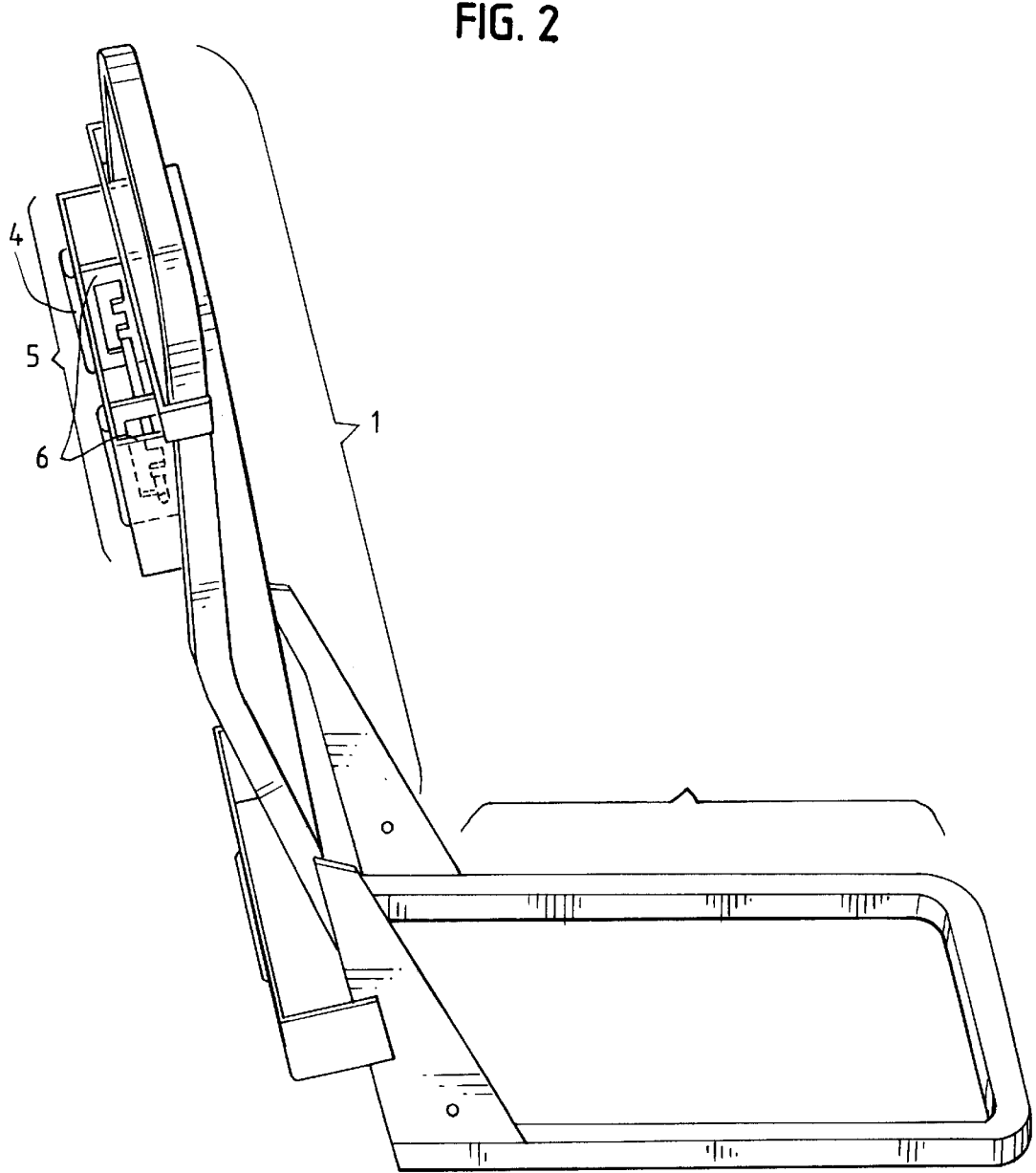
FIG. 2 is a pictorial side-elevation view of a seat illustrating the harness panel attached to the back of top-seat portion of the seat shell. The top-seat portion is shown as 1 and the bottom seat portion is shown as 2. The harness panel is shown as 5. The harness panel Is comprised, in combination, of a slot panel as shown as 6, an adjustable anchor-point shaft, shown as 4, a spring-biased medium, shown as 7, and, a spring, shown as 8.

In accordance with the present invention and in a preferred embodiment, a child restraint seat includes a seat shell having a top-seat portion, 1, and a bottom-seat portion, 2, with said top-seat portion, 1, having at least two spaced-apart belt receiving openings, 3, as illustrated in FIG. 1. A harness panel, FIG. 3, is attached to said back side of the top-seat portion, 1, in line with the belt receiving openings, 3, whereby the present invention provides the child with a comfortable and secure seat, while providing the caregiver with the comfort and ease of being able to conveniently adjust the restraint system from the front of the restraint seat.

Figure 3:
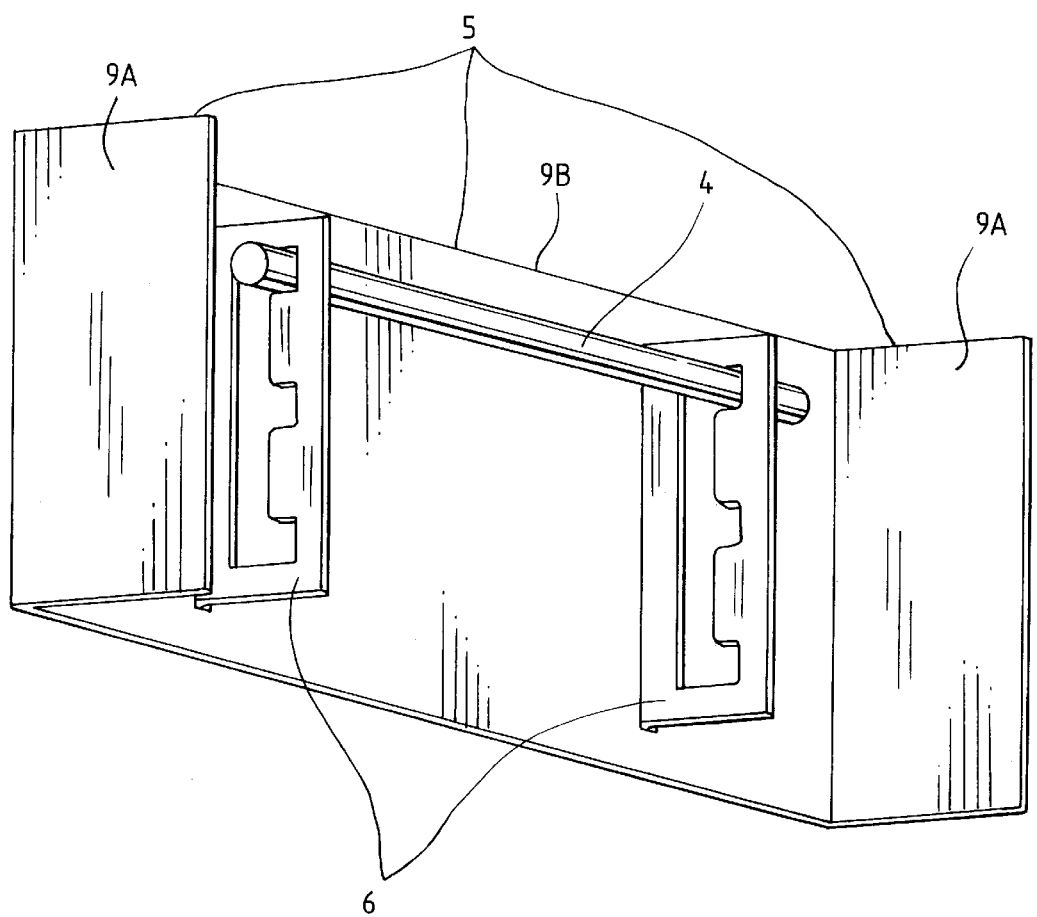
FIG. 3 is a pictorial view of the harness panel, which is shown as 5 in FIG. 1 and FIG. 2. Here, the harness panel is shown complete and removed from the seat shell. The side walls of the harness panel casing are shown as 9a, and are shown physically attached to the back wall of the harness panel casing, 9b. The slot panels are shown as 6 and shown physically attached to the back wall of the harness panel casing 9b, The adjustable anchor-point shaft is shown as 4.
Figure 4:
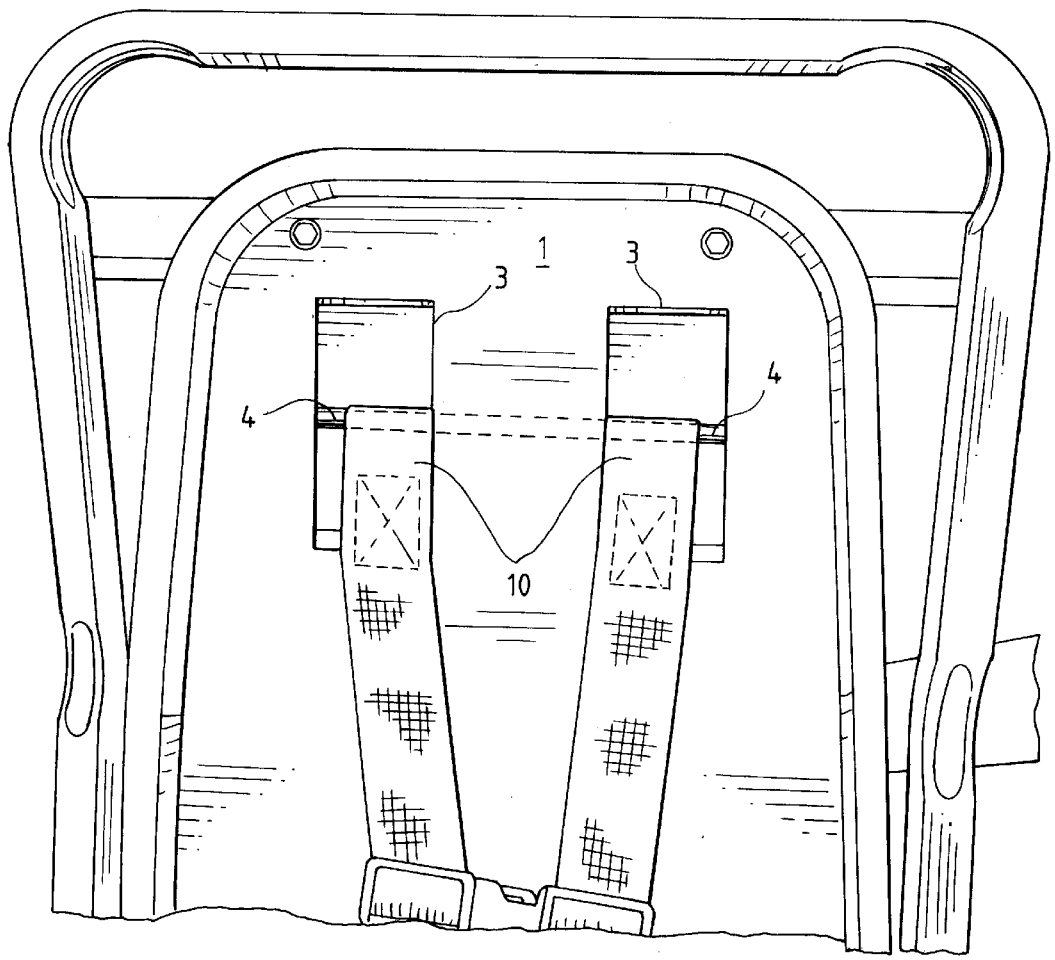
FIG. 4 is a front view of the harness being adjustably held by the anchor-point shaft in a terminal slot of slot panel 6.
Figure 3A:
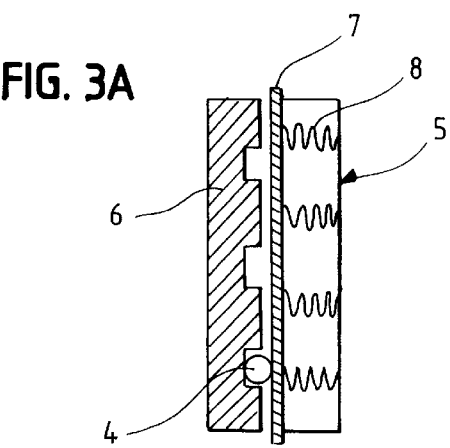
(as shown in FIG. 3A) The novelty of the invention is apparent from this view whereby the anchor-point shaft, 4, being accessible through the belt-receiving openings 3, is moveable along the slot panel 6, by a caregiver exerting a force in a direction through the front of the top-seat portion towards the harness panel, thus disengaging the adjustable anchor-point shaft from a pre-positioned slot, and allowing movement of the said shaft along the slot panel for readjustment of the restraint mechanism.

The harness panel, FIG. 3 has a harness panel casing, 9a–b, having at least three sides, two side walls, 9a, and a back wall, 9b. A top wall and bottom wall may also be used in an embodiment of the invention. The back wall, 9b, is physically attached to the two side walls, 9a, and the two side walls, 9a, are physically attached to the back of the top-seat portion, 1, of restraint seat.

The harness panel, FIG. 3, has a slot panel, 6, which is physically attached to the back wall of the harness panel casing, 9b. The preferred embodiment has the slot panel, 6, attached to the back wall of the harness casing, 9b; however the slot panel, 6, may be attached to the side walls, 9a, of the harness panel casing or the slot panel, 6, may be attached directly to the top-seat portion, 1, of the restraint chair. In the preferred embodiment, the slot panel, 6, is composed of two material flat planar pieces; one end of each piece is attached to the back wall, 9b, of said harness casing. The end of the slot panel, 6, opposite the end attached to the back wall of the harness panel casing, 9b, is formed into a structured plurality of slots, with two horizontally extending spaced-apart slots being evident when each piece of the slot panel, 6, is attached to the back wall, 9b, of the harness casing.

The adjustable anchor-point shaft, 4, and the spring-biased medium, 7, work in combination with the slot panel, 6, to provide an adjustable restraint mechanism. The adjustable anchor-point shaft, 4, is a material shaft with the circumference less than the distance between the spaced apart slots of the slot panel, 6, and a length more than the distance between the two slot panel pieces. The adjustable anchor-point shaft, 4, is held in a slot of the slot panel, 6, by a spring biased medium, 7. The spring biased medium, 7, is a flat planar material with a spring mechanism, 8, attached to one surface of the plane, while the opposite surface of the plane is in direct contact with the adjustable anchorpoint shaft, 4. The side of the spring not attached to the biased medium, 7, is attached to the back wall, 9b, of the harness casing, whereby exerting force on the medium, 7, and against the adjustable anchor-point shaft, 4, and holding the said shaft in a slot in the slot panel, 6.

As the entire harness panel, FIG. 3, is attached to the back of the top-portion, 1, of the seat shell directly behind the belt receiving openings, 3, the caregiver has ability to adjust the height of the anchor-point shaft, 4, from the front of the seat shell by simultaneously pressing against the anchor-point shaft, 4, through the belt receiving openings, 3, from the front side of the seat and moving the said shaft in a vertical motion in relation to the plane formed by the bottom-seat portion; lowering the shaft to accommodate smaller children and raising the shaft to accommodate larger children.

The restraint harness, 10, is coupled to said adjustable anchor-point shaft, 4, through the belt receiving openings, 3, of said top-portion, 1, of said seat shell. Movement of the adjustable anchor-point shaft, 4, along the slot panel, 6, thus, simultaneously controls the height of the restraint harness by nature of the restraint harness, 10, being coupled with the adjustable anchor-point shaft, 4.

The novelty of the present invention lies in the manner by which the caregiver may adjust the anchor-point shaft, 4, from the front of the seat shell through the belt. receiving openings, 3. By simply exerting a force against the anchor-point shaft, 4, forcing the said shaft against the spring-biased medium, 7, and thus dislodging the said shaft, 4, from a slot in said slot panel, 6, the caregiver may move said shaft, 4, vertically with respect to the bottom-seat portion, 2, and relocate said shaft, 4, into an alternative slot in said slot panel, 6, thus either raising or lowering the adjustable anchor-point shaft, 4, and thus raising or lowering the said restraint system.

It thus may be seen that the objects of the present inventions set forth herein as well as those made apparent from the foregoing description, are officially obtained. While preferred embodiments of the invention have been set forth for purposes of disclosure, modification of disclosed embodiments of the invention as well as other embodiments thereof may occur to those skilled in the art. Accordingly, the appended claims are intended to cover all embodiments which do not depart from the spirit and scope of the invention.

We claim:

1. An apparatus comprising in combination:

a seat shell with a bottom-seat portion and a top-seat portion, with said top-seat portion of said seat shell formed to include at least two spaced apart belt receiving openings, and said top-seat portion having a back and a front surface;

a harness panel physically attached to said back surface of said top-seat portion of said seat shell including, a slot panel having a plurality of slots, an adjustable anchor-point shaft in contact with said slot panel, a spring-biased medium positioned between sad harness-panel and said adjustable anchor-point shaft, said spring-biased medium selectively forcing said anchor-point shaft into one of said slots, and said spring biased medium being actuated through said belt receiving openings by exerting a force towards said top-seat portion, a harness panel casing, and a spring between said spring-biased medium and said harness panel casing, a restraint harness associated with said adjustable anchor-point shaft;

a restraint harness coupler attached to said bottom-seat portion of said seat shell, and said belt receiving openings enabling adjustment of said adjustable anchor-point shaft to different elevations from said front surface of said top-seat portion through said belt-receiving openings, by actuating the anchor-point shaft against the spring biased medium, thereby releasing the anchor-point shaft from an engaged slot in said slot panel and selectively moving said anchor-point shaft in an alternative slot of said slot panel to vary the height of said anchor-point shaft relative to said bottom-seat portion of said seat shell.

2. The apparatus as defined in claim 1, wherein said harness panel is attached to said back surface of the top-seat portion and directly in line with said belt receiving openings enabling said adjustable anchor-point shaft to be moved vertically in relation to the bottom seat portion through the said belt receiving openings.

3. A restraint seating apparatus comprising a seat shell with a bottom-seat portion and a top-seat portion, said top-seat portion having at least two spaced apart belt receiving openings, and also having a harness panel with a slot panel having a plurality of slots, an adjustable anchor-point shaft in contact with said slot panel, a spring-biased medium that holds said adjustable anchor-point shaft in the slots of said slot panel, and a spring between said spring-biased medium and harness panel casing; said harness panel being attached to a back surface of said top-seat portion directly in line with said belt receiving openings, and said adjustable anchor-point shaft being operable from said front surface of said top-seat portion through said belt receiving openings enabling adjustment of the restraint system from the front of the seat shell.

* * * * *